United States Patent Office 3,248,976
Patented May 3, 1966

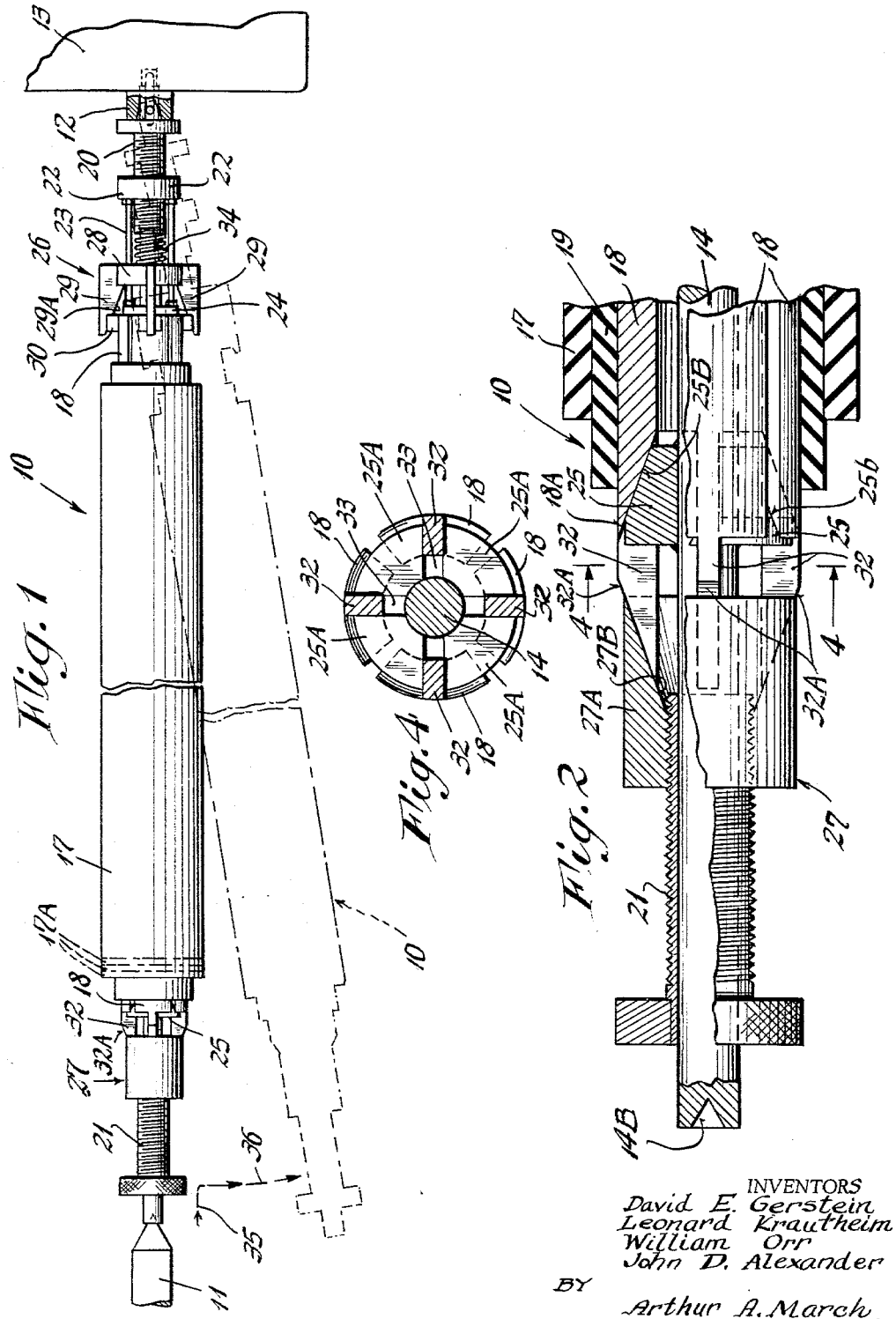

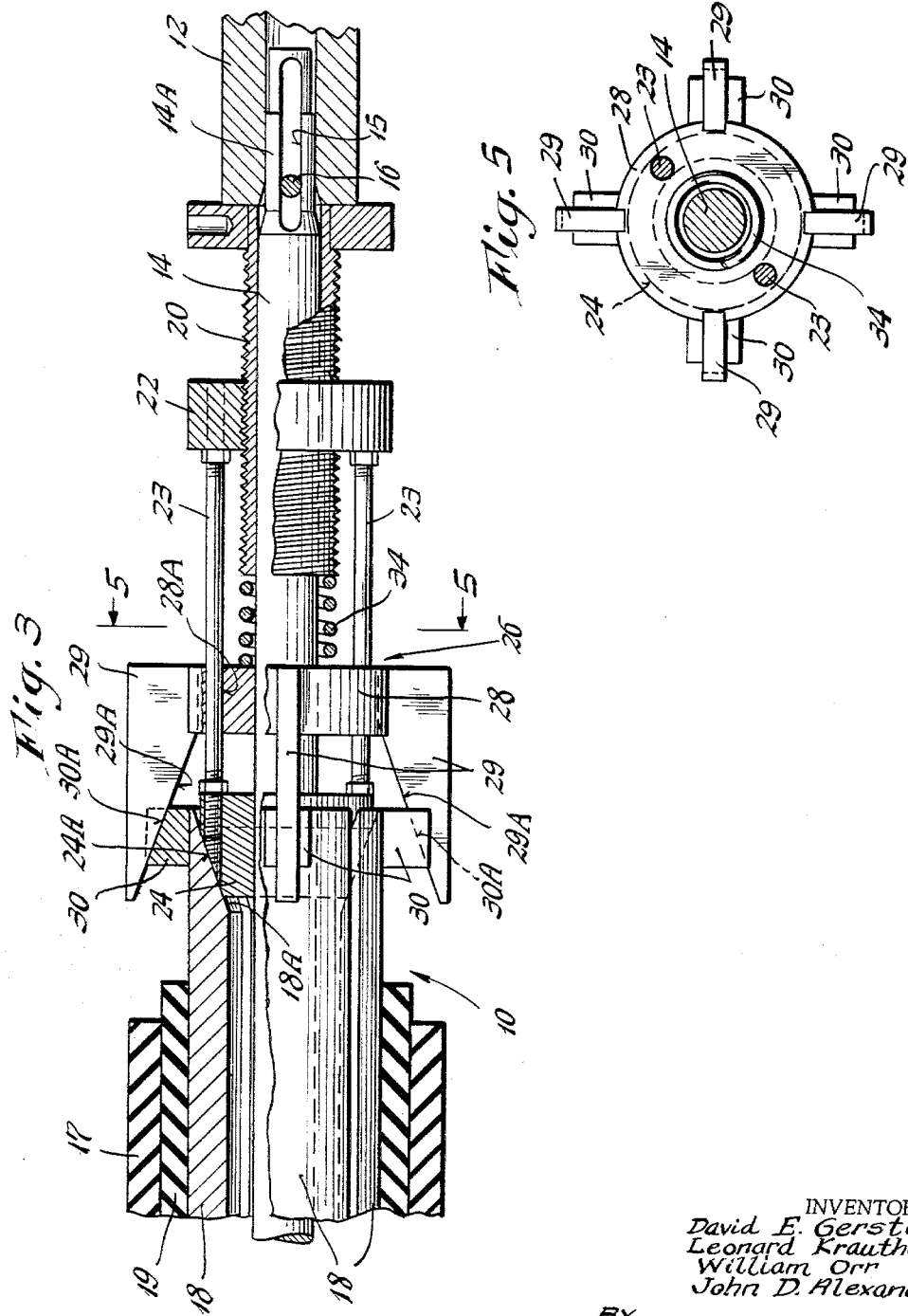

3,248,976
EXPANDABLE MANDREL
David E. Gerstein, Forest Hills, N.Y., and Leonard Krautheim, Haledon, William Orr, Hohokus, and John D. Alexander, Hawthorne, N.J., assignors to Lever Manufacturing Corporation, Paterson, N.J., a corporation of New York
Filed Nov. 13, 1963, Ser. No. 323,393
5 Claims. (Cl. 82—44)

This invention relates in general to an improvement for roll splitting machines, and more specifically, to an expandable mandrel construction adapted for use on such roll splitting machines.

The forming of articles, as for example, washers, rings, gaskets, seals, jaw washers and the like, is generally accomplished by cutting or severing the same from tubular stock material. The severing or cutting of such tubular stock material into rings, gaskets, washers and the like is generally accomplished by mounting the tubular stock onto a mandrel of a roll splitting or cutting machine. The mandrel and tubular stock material disposed thereon is then rotated relative to a suitable cutting blade whereby the tubular stock material is severed into a plurality of rings, gaskets, washers or the like.

Heretofore, considerable difficulty has been encountered in loading such tubular stock material onto a mandrel and in stripping the severed rings, gaskets, washers and the like therefrom upon completion of the cutting operation. This difficulty was due to the fact that the covering or the outside diameter of the mandrel was required to be slightly greater than the inside diameter of the tubular stock material placed thereover to insure a snug fit therebetween. For this reason, the tubular stock material has to be forcibly loaded onto the mandrel with the aid of compressed air. One of the difficulties that has resulted from such loading of tubular stock material onto a mandrel of a roll splitting machine is that the tubular material when inflated with compressed air is stretched along certain portions thereof and compressed along other portions thereof. Consequently, washers, rings, gaskets, cut from that portion of the tubular stock material which has been stretched will shrink upon removal thereof from the mandrel to form undersized rings. Gaskets, washers, and rings cut from those portions of the tubular stock material which has been compressed will tend to spring outwardly upon the removal thereof from the mandrel to form oversized rings, gaskets, seals or the like. Consequently, it has been heretofore almost impossible to attain uniformity of finished rings, gaskets, seals and the like, cut from a common stock of tubular material.

Another disadvantage of loading tubular stock material onto a mandrel by forcing the same with compressed air, is that the operator is required to have on hand auxiliary air pressure generating and handling equipment. Further, since the mandrels of such roll splitting machines for the most part comprise a relatively heavy, bulky piece of equipment, moving equipment in the form of a hoist, left, crane or the like is required to effect the moving and lifting of the mandrel in loading and unloading. Consequently, the loading of a mandrel with tubular stock material and the stripping of the same of the severed articles formed therefrom constitutes a relatively costly, tedious and time consuming operation requiring the need of special handling equipment. It has been further noted that each size of tubular stock material required a specific sized mandrel. Therefore, in order to run a range of stock sizes, an operator was required to have on hand an inventory of several different sized mandrels. Since each mandrel constituted a substantial component of the roll cutting machine, a considerable initial cost had to be expended for inventorying a number of differently sized mandrels.

Therefore, an object of this invention is to provide an improved mandrel construction for use in roll cutting machines which are capable of handling a relatively large range of various tubular stock sizes, and thereby minimize the number of mandrels heretofore required to accommodate the same range of tubular stock sizes.

Another object of this invention is to provide an improved expandable mandrel which can be expanded and contracted along its entire length in a manner to uniformly stress the tubular stock material placed thereon, so that the washers, rings, seals and the like cut therefrom are all uniform in size.

Another object of this invention is to provide an improved mandrel constructed and arranged to facilitate the loading and stripping thereof.

Still another object of this invention is to provide a mandrel construction in which the loading and stripping thereof can be readily attained without the need of bodily removing the mandrel from the chuck or head stock of the roll splitting machine.

Another object of this invention is to provide an improved expandable mandrel that is relatively simple in construction and positive in operation.

Still another object is to provide an expandable mandrel with means for determining the minimum and maximum expanded and contracted positions thereof.

In accordance with this invention, the above objects, features and other advantages are readily attained by providing an improved mandrel construction for use on a roll splitting machine. The mandrel is constructed and arranged to facilitate the loading and stripping of the material severed in a simple and expedient manner. Essentially, the mandrel comprises a shaft adapted to be journalled between the head stock and the tail stock of a roll splitting machine. One end of the shaft is constructed and arranged to be swivelly or pivotally connected to the head stock of the machine so that one end of the mandrel may be swung outwardly therefrom to expedite loading and unloading of the mandrel without effecting total removal of the mandrel from the machine. Means in the form of a plurality of shoes are disposed about the shaft for movement between radially expanded and retracted positions with respect to the shaft to vary the outside diameter of the mandrel accordingly. Means in the form of a pair of longitudinally spaced inner tapering or camming means are disposed along the shaft to engage ends of the respective shoes to limit the minimum contraction thereof, one of the inner tapering means being fixed to the shaft and the other being rendered adjustable relative thereto. Cooperating and associated with the outer ends of the respective shoes is a pair of outer limiting means for determining the maximum expanded position of the respective mandrel shoes. One of the outer limiting means is fixed to the shaft and the other rendered relatively adjustable thereto. Accordingly, the inner pair of limiting means are rendered adjustable relative to each other to vary and determine the minimum contracted limits of the mandrel shoes, and the outer pair of limiting means are also rendered readily adjustable with respect to one another to vary and determine the maximum expanded limit or position of the respective mandrel shoes. Covering the respective shoes is a casing or cover formed of a resilient material which is free to expand and contract with the shoes accordingly and the casing defines the surface of the mandrel over which a tubular stock material is placed.

Therefore, a feature of this invention resides in the provision that the mandrel can be readily expanded and contracted in a radial direction relative to the axis of the shaft in a uniform manner along the entire length thereof so as to accommodate a variety of differently sized tubular stock material.

Another feature of this invention resides in the provision of positive means for limiting the maximum expanded position of the mandrel.

Still another feature of this invention resides in the provision of inner and outer limiting means which are rendered relatively adjusted with respect to one another so as to vary and determine the inner and outer expansion limits of the mandrel to determine a given range.

Another feature resides in means for swivelly connecting the mandrel to the head stock of a roll splitting machine permitting the same to swing outwardly to permit loading and unloading of the mandrel without requiring the same to be bodily removed from the machine.

Another feature of the invention resides in the provision that the instant mandrel construction completely eliminates the need of resorting to compressed air handling equipment heretofore required for loading a length of tubular stock material onto a mandrel and of the lifting and hoisting equipment heretofore required for removing and placing the mandrels onto a roll splitting machine.

Another feature of this invention resides in the provision of means for normally maintaining the mandrel in its minimum retracted position when in its relaxed or inoperative position.

Other features and advantages will become more readily apparent when considered in view of the description and drawing in which, FIG. 1 is a top plan view of the mandrel of the instant invention illustrated in its operative position between centers of the head stock and tail stock of a roll splitting machine. The dash line position of the mandrel as seen in FIG. 1 illustrates the same in its swivelled position for either loading or unloading the same.

FIG. 2 is an enlarged fragmentary detail of the tail stock end of the mandrel, partly shown in section.

FIG. 3 is an enlarged detail of the head stock end portion of the mandrel which is partly sectionalized.

FIG. 4 is a sectional view taken along line 4—4 of FIG. 2.

FIG. 5 is a sectional view taken along line 5—5 of FIG. 3.

Referring to the drawings, there is shown in FIG. 1, as indicated by the solid line drawing thereof, the position of the mandrel 10 as it is disposed between the center 11 of a tail stock and a head stock 12 of a roll splitting machine 13. Since the instant invention is particularly concerned with the mandrel construction 10 of the roll splitting machine, a detailed description of the machine is not made as it does not constitute any part of the invention.

Essentially, the mandrel 10 comprises a main shaft 14 which is adapted to extend between centers of a head stock and tail stock of a roll splitting machine 13. As shown, one end of the shaft 14 is provided with a reduced end portion 14A which is adapted to fit into the collet or chunk 12 of the head stock. As shown, the reduced end portion 14A of the shaft is provided with a horizontally disposed elongated slot 15 through which a pin 16 is extended. The arrangement is such that the mandrel can be moved longitudinally relative to the head stock, as seen in FIG. 1 as well as laterally outwardly of the machine in the manner indicated in the dash line illustration of FIG. 1. Thus, as it will be hereinafter described, the mandrel 10 is swung outwardly from between the tail stock and head stock to facilitate the loading of the tubular stock material 17 thereon and to effect the removal of the rings, gaskets and seal 17A formed therefrom.

The specific construction of the mandrel 10 is particularly adapted to expedite the loading of the stock material 17 thereon and of the removing of severed articles 17A therefrom without bodily removing the mandrel from between the head stock and the tail stock of the roll cutting machine. In accordance with this invention, the mandrel 10 includes a plurality of elongated shoes 18 which are circumferentially spaced about the shaft. In the illustrated embodiment, four such shoes 18 are provided, each covering substantially a quadrant portion of the mandrel in cross-section and each shoe extends along a considerable length of the shaft 14. As shown in FIGS. 2 and 3, the respective end portions of the shoes 18 are provided with a tapering inner end surface 18A which is tapered upwardly and outwardly of the respective shoes. Accordingly, the respective shoes 18 are arranged so as to be expanded and contracted radially about the shaft 14 so as to vary the outside diameter of the mandrel. Encasing the shoes 18 is a covering of resilient tubular material 19, as for example, rubber, which will expand and contract with the shoes 18 accordingly. Thus, the resilient covering 19 defines the outer surface of the mandrel 10 over which the tubular stock material 17 from which the gaskets 17A are to be formed is placed.

Means 24, 25 are provided for limiting the minimum retraction or contraction of the respective shoes 18 and casing 19 enclosing the same. Means are also provided for positively limiting the maximum radial expansion of the respective shoes and casing enclosing the same.

As shown in FIG. 1, externally threaded sleeves 20, 21 are slidably disposed on the shaft 14 adjacent each end thereof. Adjustably threaded to one of the sleeves 20 is a collar 22 which has connected thereto a pair of longitudinally extending guide rods 23. Connected to the other ends of the guide rods 23 is the adjustable member 24 of the inner pair of limiting means. Essentially, the adjustable member 24 of the inner pair of limiting means comprises a conical member provided with an external tapering surface 24A arranged to complement the adjacent tapered inner end portion 18A of the respective shoes 18. It will be readily apparent that as the sleeve 20 is rotated collar 22 is adjusted longitudinally of the shaft in one direction or the other, and that the adjustable member 24 of the inner limiting means is longitudinally shifted along the axis of the shaft 14 accordingly.

The fixed member 25 of the inner pair of limiting means 24, 25 comprises a series of circumferentially spaced conical segments 25A which are rigidly or fixedly secured to the shaft 14 adjacent the other end thereof by means of welding or the like. As shown, the fixed conical segments 25A of the inner limiting means 24, 25 are each provided with inclined surfaces 25B complementing the inclined surfaces 18A of the adjacent taper ends of the respective shoes 18. As will be hereinafter described, the distance between the inner ends of the respective pair of inner tapering means 24, 25 define the minimum retraction or contracted position of the shoes 18.

The outer limiting means 26, 27 comprises a fixed means 26 and a means 27 relatively adjustable thereto. The fixed element 26 of the outer limiting means 26, 27 comprises a collar 28 which is fixedly secured to the shaft 14 by any suitable means, as for example, welding. A plurality of circumferentially spaced wedge members 29 are secured to the fixed collar 28. As shown, the inclined surfaces 29A of the respective wedges 29 are arranged to overlie or extend over the adjacent end portions of the respective shoes 18. Fixed to each of the shoes 18 is a wedging block 30 formed with a complementary groove with a tapered surface 30A for engaging the inclined surfaces 29A of the wedge members 29. It will thus be apparent that engagement between the wedge blocks 30 with the inclined surface 29A of its respective limiting wedge members 29 effectively limit the outward expansion of the shoes 18. Since the collar 28 of the fixed outer limiting member 26 is fixed between the threaded sleeve 20 and the adjustable inner tapering member 24, it will be noted that the collar 28 is provided with a pair of axial bores 28A for receiving the rods 23 which connect the inner tapering member 24 with its adjusting collar 28.

The adjustable member 27 of the outer pair of limiting means 26, 27 comprise a sleeve 27A which is threaded onto the threaded sleeve 21. The adjustable sleeve 27A is provided with a conically shaped bore 27B diverging outwardly toward the end of the mandrel shoes 18. As shown in FIG. 2, wedge projections 32 are integrally connected to the left end of each shoe 18. Each of the respective wedge projections 32 is provided with an inclined surface 32A arranged to complement and be received within tapered bore 27B of the adjustable outer limiting sleeve 27A. As best seen in FIG. 4, the projection 32 extends through the space 33 from between adjacent conical segments 25A of the fixed member of the inner limiting means 24, 25. The arrangement is such that the contraction and expansion of the shoes 18 within a given range is determined by the positioning of the respective members of the inner and outer pair of limiting means.

From the foregoing description, it will be noted that the distance between tips of the inner limiting means 24, 25 determines the minimum contraction of the mandrel, and that the distance between the inner edges of the outer pair of limiting means 26, 27 determines the maximum expansion of the mandrel. By properly setting these distances to predetermined limits, the minimum and maximum limits of expansion and contraction of the mandrel can be determined or varied at will. Thus, it will be apparent that the sizes of tubular stock material 17 adapted to be fitted onto a single mandrel can vary within the minimum and maximum expansion limits of the mandrel 10.

A spring means 34 in the form of a coil spring is interposed between the threaded sleeve 20 and the fixed collar 28 of the fixed outer limiting means 26. The function of the spring 34 is to normally exert a force tending to bias the mandrel 10 outwardly or away from the collet 12 or head stock.

In operation, the mandrel 10 can be readily swung outwardly as indicated by the dash lines of FIG. 1 so as to dispose it in a position in which the tubular stock material 17 can be easily fitted thereto. In accordance with this invention the mandrel 10 in its relaxed position is normally contracted by proper adjustment of the inner limiting means to define a mandrel outside diameter which is less than the inside diameter of the tubular stock material 17 adapted to be placed thereon. It will then be readily apparent that, as the tubular stock material 17 has an inside diameter which is larger than the outside diameter of the mandrel onto which it is placed, it can be readily fitted thereon wihout resorting to the use of any external means, as for example, compressed air. With the stock material 17 properly disposed onto the mandrel by simply placing the same thereover, the mandrel is swung into position to axially align the same between centers of the tail stock and head stock. To facilitate registration of the center of the tail stock with the end of the shaft 14, the shaft is provided with a counterbore 17A for receiving the center 11 of the tail stock. The tail stock is then moved toward the head stock thereby applying a pressure or force on the end of the mandrel 10 causing the shaft 14 to be longitudinally displaced toward the head stock. The elongated slot 15 formed in the reduced end portion 14A of the shaft facilitates this limited longitudinal movement of the shaft as the tail stock center is moved toward the head stock. When this occurs, the inner member 25 of the fixed limiting means is brought into engagement with the complementary inclined surface 18A of the shoes 18 causing the same to be radially expanded by the camming effect of the pair of inner limiting means on the inclined ends of the shoe. Expansion of the shoes is continued until the outside diameter as defined by the casing 19 of the mandrel is snugly fitted into the inside diameter of the tubular stock material 17 fitted thereon. This maximum expanded limit is positively predetermined by the adjustable sleeve 27 of the outer pair of limiting means and the restricting members 29 of the fixed outer limiting means 26. When the ends of the mandrel are limited by these means, it is not possible for the mandrel to be further expanded. Accordingly, the maximum expansion of the mandrel can be positively predetermined to insure uniform expansion of the tubular stock material by placing its entire length in a uniform snug fit with the mandrel. Thus, with the tubular stock material 17 uniformly stressed over its entire length, the cutting operation can then be commenced. To accomplish this the machine is energized to effect rotation of the mandrel and the stock material 17 disposed thereon relative to the suitable cutting blades (not shown) of the machine. After the respective tubular stock 17 has been severed into its respective rings, seals, gaskets 17A and the like, the operation of the machine is stopped.

To remove the articles 17A thus formed from the mandrel, the center of the tail stock is backed off causing the spring 34 to shift the mandrel into its relaxed state, that is, to the contracted shoe position. A slight force is then applied to the end of the mandrel in the direction of the head stock as indicated by arrow 35. The force applied need only be sufficient to overcome the bias of the spring 34 to disengage the tail end 14B of the shaft 14 from the tail stock center 11. When this occurs, the mandrel may be swivelled outwardly as indicated by arrows 36 in FIG. 1, to a position indicated by the dotted lines thereof. With the mandrel so positioned, the severed articles 17A thereon can be readily removed therefrom inasmuch as the O.D. of the mandrel has contracted to a point where it is substantially less than the internal diameter of the severed articles thereon. Consequently, the individual gaskets are free to be readily removed therefrom. After the rings 17A have been removed from the mandrel, another tubular stock material is disposed onto the mandrel and the operation repeated.

From the foregoing, it will be readily apparent that the mandrel construction of the instant invention expedites both the loading and stripping of the articles therefrom. Also, the instant construction minimizes or eliminates the need for utilizing any of the special handling equipment for loading and unloading the tubular stock material and the finished product therefrom, heretofore required. Further, the mandrel of the instant construction obviates the need for physically removing the entire mandrel from the machine. The mandrel in accordance with this invention is also adapted to accommodate a relatively large range of varying sizes of stock material and thereby completely eliminate the need for maintaining a relatively large inventory of varying size mandrels on hand.

While the instant invention has been described with reference to a particular embodiment thereof, it will be understood and appreciated that variations and modifications thereof may be made without departing from the spirit or scope of the invention.

We claim:

1. In a roll splitting machine having a head stock and a tail stock spaced therefrom, the improvement of an expandable mandrel comprising:

(a) a shaft adapted to be journalled between the head stock and tail stock, (b) a plurality of shoes mounted about said shaft for movement between expanded and retracted positions, (c) means for effecting the expansion and retraction of said shoes, (d) a pair of inner spaced apart tapered members mounted on said shaft for limiting the minimum retracted position of said shoes, (e) a pair of outer longitudinally spaced means for limiting the maximum expanded position of said shoes, (f) and means for adjusting one of said inner and outer limiting means relative to the other of said pair.

2. In a roll splitting machine having a head stock and a tail stock spaced therefrom, the improvement of an expandable mandrel,
  (a) said mandrel including a shaft adapted to be journalled between the head stock and tail stock,
  (b) a plurality of shoes mounted about said shaft for movement between and expanded and retracted position,
  (c) means for effecting the expansion and retraction of said shoes,
  (d) a pair of inner spaced apart tapered members mounted on said shaft for limiting the minimum retracted position of said shoes,
  (e) a pair of outer longitudinally spaced means for limiting the maximum expanded position of said shoes,
  (f) means for adjusting one of said pair of minimum limiting members relative to the other member,
  (g) and means for adjusting one of said pair of maximum limiting means relative to the other independent of said means for adjusting one of said pair of minimum limiting members.

3. An expandable mandrel for use on a roll splitting machine comprising:
  (a) a shaft adapted to be journalled between the centers of a tail stock and head stock of a roll splitting machine,
  (b) a plurality of shoes circumferentially spaced about said shaft, each of said shoes extending longitudinally of said shaft,
  (c) said shoes having respective end portions internally tapered to diverge outwardly toward the ends thereof,
  (d) a pair of spaced inner tapering cam means spaced along said shaft and arranged to cammingly engage the internal taper formed in the end portions of said shoes for effecting expansion of said shoes,
  (e) one of said inner cam tapering means being fixed to said shaft and the other being rendered adjustable relative to said fixed cam whereby the distance therebetween controls the minimum retraction of said shoes,
  (f) a pair of spaced apart outer limiting means longitudinally spaced along said shaft,
  (g) one of said pair of outer limiting means being fixed to said shaft and the other being rendered adjustable relative thereto whereby the distance therebetween limits the maximum expansive limits of said shoes,
  (h) and a resilient covering sleeve fitted over said shoes to form an expandable covering therefor.

4. In a roll splitting machine having a head stock and a tail stock, the improvement of an expandable mandrel adapted to be journalled therebetween and comprising:
  (a) a shaft adapted to be supported between the head stock and tail stock,
  (b) the shaft having a reduced end portion adapted to be received in said head stock,
  (c) means including an elongated slot formed in the reduced end of said shaft and a transverse pin extending transversely through said slot whereby said shaft is rendered longitudinally displaceable and swivelly connected relative to the head stock,
  (d) an externally threaded sleeve fitted to each end of said shaft,
  (e) a plurality of shoes circumferentially spaced about said shaft, said shoes extending longitudinally of said shaft between said sleeves and said shoes being mounted for radial movement about said expanded and retracted positions,
  (f) each of said shoes having internally tapered end portions converging inwardly thereof,
  (g) limiting means for restricting the minimum retraction of said shoes,
  (h) said minimum limiting means including a first and second inner tapered means,
  (i) said first inner tapering means being fixed to said shaft, and said second inner tapering means being slidably mounted on said shaft and rendered longidinally adjustable along said shaft relative to said first inner tapering means,
  (j) each of said first and second tapering means having inclined surfaces complementing the tapered inner ends of the respective shoes adjacent thereto whereby the distance between said first and second inner tapering means determine the minimum retraction limits of said shoes,
  (k) said means for adjusting said second inner limiting means includes a collar threaded to one of said threaded sleeves, and a pair of connecting rods connecting with said second inner tapering means whereby rotation of said one of said threaded sleeves effects longitudinal adjustment of said second tapering means along said shaft and relative to said first inner tapering means accordingly,
  (l) a pair of outer limiting means spaced along said shaft and disposed outward of the respective ends of said shoes,
  (m) said outer limiting means including,
  (n) a fixed collar fixed to the shaft adjacent one end of said shoes, and an adjustable sleeve disposed adjacent the other end of said shoes,
  (o) said fixed collar having a plurality of circumferentially spaced wedge members extending over the adjacent ends of said shoes,
  (p) said adjacent ends of said shoes having a complementary wedge connected to the outer surface thereof, said wedge having complementary inclined surfaces for engaging the incline of said wedge members to limit the expanded position of said shoes,
  (q) and said adjustable sleeve being threaded to the other of said externally threaded sleeves,
  (r) said adjustable collar having an internally tapered surface diverging outwardly therefrom,
  (s) and said adjacent ends of said shoes having projecting wedge shaped members provided in inclined surfaces complementing the internal taper surface of said adjustable collar so that the projecting wedge shaped members are readily received in said adjustable sleeve to determine the maximum expandable limits of said shoes,
  (t) and a spring means disposed between said first mentioned threaded sleeve and said fixed collar for biasing said shaft between the head stock and tail stock.

5. The invention as defined in claim 4 and including an expandable covering for said shoes whereby said covering will expand and retract with the movement of said shoes to determine the O.D. of the mandrel.

References Cited by the Examiner

UNITED STATES PATENTS

| | | | |
|---|---|---|---|
| 94,358 | 8/1868 | Spooner | 82—92 |
| 537,789 | 4/1895 | Sinclair | 242—72.1 |
| 581,377 | 4/1897 | Veeder | 82—93 |
| 1,777,316 | 10/1930 | Kuffner | 82—44 |
| 1,825,925 | 10/1931 | Shenk | 82—44 |
| 1,953,205 | 4/1934 | White et al. | 82—86 |
| 2,678,100 | 5/1954 | Lomazzo et al. | 82—44 X |
| 2,698,551 | 1/1955 | Olsen | 82—44 |
| 2,808,753 | 10/1957 | Brown | 82—44 |
| 3,113,744 | 12/1963 | Nisenson | 279—2 X |

FOREIGN PATENTS 1,916  1/1914  Great Britain.

WILLIAM W. DYER, Jr., *Primary Examiner.*